Dec. 16, 1969   H. J. WEISENTHAL   3,483,940
HIGH SENSITIVITY OMNI-FREQUENCY MICROPHONE
Filed Jan. 23, 1968   2 Sheets-Sheet 1
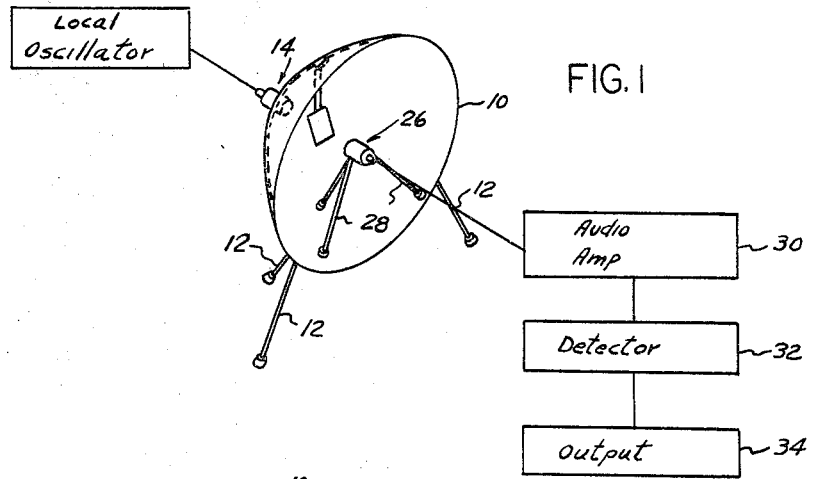
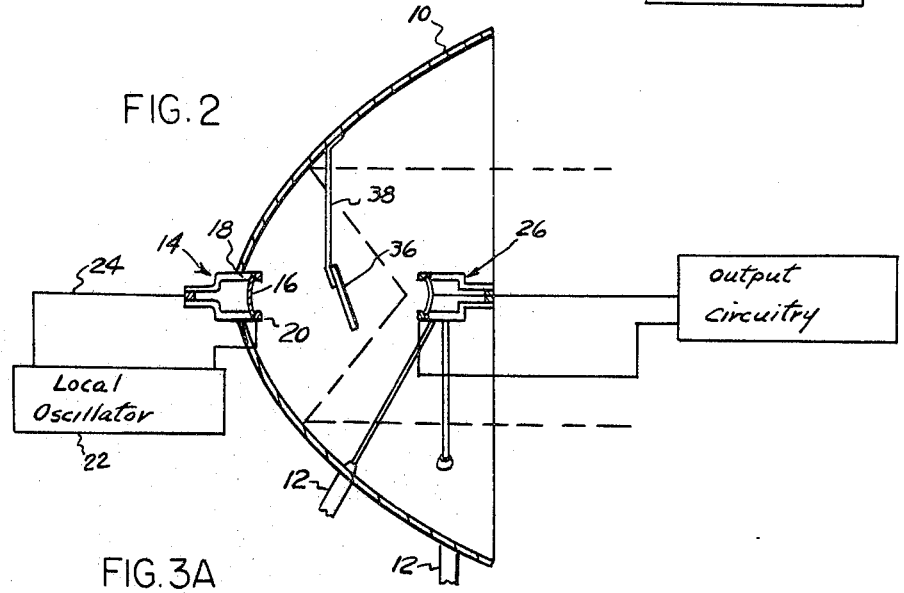
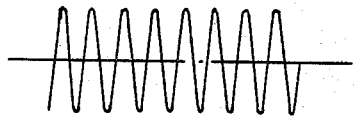
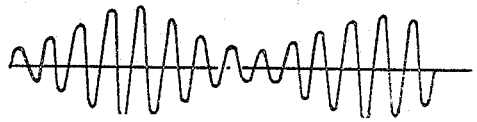
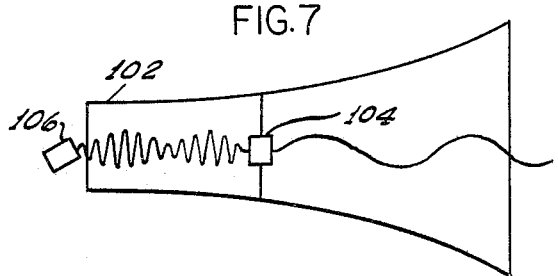
INVENTOR
HOWARD J. WEISENTHAL
BY Hauke, Kress, Gifford, & Patalidis
ATTORNEYS Dec. 16, 1969  H. J. WEISENTHAL  3,483,940
HIGH SENSITIVITY OMNI-FREQUENCY MICROPHONE
Filed Jan. 23, 1968  2 Sheets-Sheet 2

INVENTOR
HOWARD J. WEISENTHAL

BY Hauke, Kress, Gifford, & Patalidis
ATTORNEYS

United States Patent Office 3,483,940
Patented Dec. 16, 1969

3,483,940
HIGH SENSITIVITY OMNI-FREQUENCY
MICROPHONE
Howard J. Weisenthal, 27401 Nantucket,
Southfield, Mich. 48075
Filed Jan. 23, 1968, Ser. No. 699,898
Int. Cl. G10k 10/00
U.S. Cl. 181—.5        13 Claims

ABSTRACT OF THE DISCLOSURE

Apparatus for generating an electric signal having a wave form corresponding to that of received sound waves employs a parabolic reflector to focus waves impinging on a relatively large area into a smaller area. A local sonic generator of a fixed frequency higher than that of the incoming sonic energy projects its output toward the focal point of the sonic energy. The interference between the two waves provides an output which includes a wave having a frequency of the local sonic oscillation modulated by the received sonic energy. A transducer having a resonant frequency which differs slightly from the sonic oscillator receives the wave and generates an equivalent electrical output. Means are provided to prevent the establishment of standing waves between the local oscillator and the transducer. In other embodiments the received sonic energy is concentrated by mechanical means which act to modulate the local oscillator signal.

BACKGROUND OF THE INVENTION

Field of the invention

This invention relates to systems for generating electrical signals having wave forms which correspond to that of received sonic waves, and more particularly to highly sensitive systems wherein the efficiency of the translation process is independent of the frequency of the incoming sonic waves.

Description of the prior art

A wide variety of microphones have been developed to act as transducers for generating electrical waves having forms corresponding to incoming sonic waves. While these microphones take a number of forms, all employ the common principle of allowing the incoming sonic waves to impinge on some mechanical structure so as to induce motion in the structure which corresponds to the sonic wave form. This motion may be either used to directly generate an electrical signal as in the case of crystal microphones, or to modulate existing electrical currents as in the case of carbon and capacitor microphones. Because all mechanical structures provide varying degrees of sensitivity to waves of differing frequency, being resonantly sympathetic to certain frequencies and unsympathetic to others, the sonic to electrical conversion process is inherently non-linear with respect to frequency. Great efforts have been made to provide microphones having mechanical members which provide a uniform amplitude response over a wide range of frequency inputs, but often this approach to a omni-frequency characteristic has been achieved only at a sacrifice to overall sensitivity.

A broad object of the present invention is to provide a system for generating electrical waves which are the analogue of incoming sonic waves, which system is equally sensitive to incoming waves of a wide range of frequencies and which is highly sensitive so as to be able to produce electrical waves which are the clear analogue of very weak sonic waves.

SUMMARY OF THE PRESENT INVENTION

The present invention achieves these objectives by utilizing the incoming sonic signal to modulate a locally generated sonic wave of a higher frequency. The resultant modulated wave is converted into an electrical signal by a microphone which has a high degree of sensitivity to the local oscillator frequency. The resultant electrical wave form is a signal of the local oscillator frequency having a modulated envelope which reconstructs the original sonic wave. By appropriately detecting this wave form, an electrical representation of the incoming sonic wave is created.

Throughout this application the term "sonic wave" will refer to a pressure wave as opposed to an electric-magnetic wave. This pressure wave may be propagated through the atmosphere or through fluids and may be of either above or below the range which the ear can detect.

Since the sonic waves impinging upon the microphone used in the system are of a constant frequency, the varying sensitivity of the microphone to different frequencies will not deleteriously affect its operation. The frequency of the local sonic oscillation may be chosen so that the microphone is highly sensitive to that frequency so that the overall sensitivity of the system may greatly exceed that of the microphone alone.

In order to further increase the sensitivity the incoming sonic waves are appropriately focused or channeled to their point of interaction with the local oscillator. One of the preferred embodiments of the invention subsequently described achieves focusing action by use of a parabolic reflector. The local oscillator is disposed at the center of the reflector and projects its output toward the focal point. The microphone is supported at the focal point so it receives the modulated local carrier. An attenuator is supported between the local oscillator and the microphone to prevent standing waves from occurring.

The broad object of the present invention is therefore to provide a sonic receiver system wherein the sonic waves are used to modulate a local oscillator wave and the microphone acts as a transducer to convert such modulated local oscillator wave to an electrical signal; such system providing important advantages over the prior art in terms of sensitivity and frequency response.

Other objects, advantages and applications of the present application will be made apparent by the following detailed description of several preferred embodiments of the invention. The description makes reference to the accompanying drawings in which:

FIGURE 1 is a perspective view of a system representing a first embodiment of the invention;

FIGURE 2 is a sectional view through the device of FIGURE 1;

FIGURES 3A, 3B and 3C are respectively representations of the incoming sonic wave, the local oscillator signal and the input to the microphone in all of the embodiments;

FIGURE 7 is a schematic diagram of a fifth embodiment of the invention wherein a horn is used to concentrate the incoming sonic waves.

Figure 4:
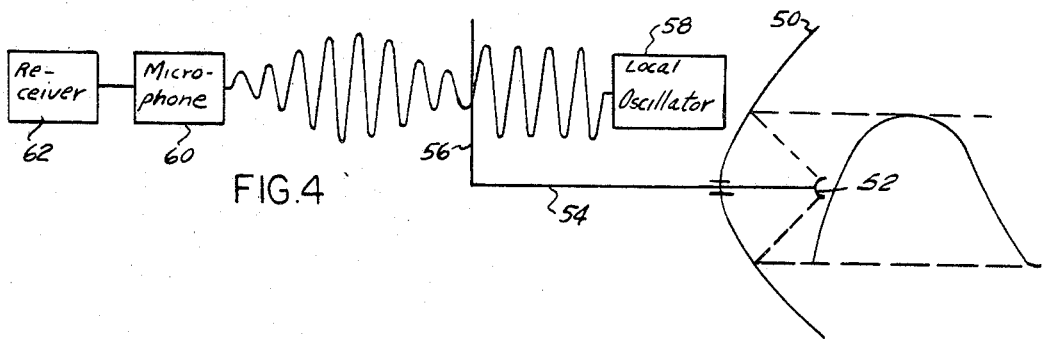
FIGURE 4 is a schematic view of a second embodiment of the invention wherein the incoming waves are caused to vibrate a diaphragm which modulates the local carrier.

Referring to the drawings, a first embodiment of the invention, illustrated in FIGURES 1 and 2, is built about a concave parabolic reflector 10, preferably formed of a lightweight metal or plastic. The reflector 10 is supported on three legs 12 fixed to space points on its outer edge. In order to achieve optimum performance of the present invention, the reflector 10 should be designed so as to reflect incoming sonic waves of all frequencies, or at least the frequencies to which the system is to be sensitive, in a relatively equal manner. Because of the large size of the reflector relative to the diaphragms of microphones, it is much easier to approach this ideal response curve in a reflector than in a microphone.

An electric-acoustic transducer, generally indicated at 14, is supported at the center of the reflector 10. The transducer may be any of a wide variety available, including loudspeakers or quartz transducers of the type utilized to generate ultrasonic vibrations. The primary design factor is the frequency at which the transducer is to operate, which is greater than the highest frequency of interest in the incoming sound wave by a factor of at least 3 or 4. If the entire sonic spectrum, i.e. 15–15,000 cycles is of interest, the transducer 14 should be capable of operating efficiently at at least 50,000 cycles per second.

The transducer 14 employed in the first embodiment of the invention is a quartz transducer of the general type used to induce ultrasonic energy into solutions for mixing and cleaning purposes. It employs a quartz diaphragm 16 supported in an insulating shell 18. A conducting ring 20 surrounds the forward perimeter of the diaphragm and provides one electrical connection to a local oscillator 22. A connector 24 joins the center of the rear side of the diaphragm to the other terminal of the oscillator.

The diaphragm 16 is illustrated as having a concave curvature on its outer side. It thus tends to project the pressure waves which it generates in a quite narrow beam which has a focal point some distance from the transducer. This focal point of the sonic energy is at a point closely proximating the focal point of parabolic reflector 10.

The local oscillator 22 may be of a vacuum tube or transistor variety capable of generating sufficient power to fully excite the transducer 14. The oscillator 22 may be of a controllable frequency for the purpose of optimizing the performance of the unit to varying environmental conditions.

A quartz microphone, generally indicated at 26, is supported with its diaphragm slightly beyond the focal point of the parabola along its central axis, facing the transducer 14. It is retained in this position by three legs 28 which are supported above spaced points in the lower edge of the reflector. The microphone 26 may be of a standard quartz variety. It preferably has its highest sensitivity to sonic waves of a frequency separated from the frequency of the local oscillator 22 by sufficient degree to prevent ringing of the microphone crystal. For example, if the local oscillator has a frequency of 95,000 cycles per second the quartz microphone 26 may have its point of maximum sensitivity at 100,000 cycles per second.

The output of the microphone 26 is provided to a receiver circuit which consists of a suitable amplifier 30, a detector 32 and an appropriate output device 34. The output device may typically be a loudspeaker, an oscilloscope or a recorder, depending upon the requirements of the system.

The first embodiment of the invention also employs an attenuating sheet 36 consisting of a flat metallic plate supported between the transducer 14 and the microphone 26 at an angle with respect to the two. The plate 36 is retained from the reflector 10 by a hanger member 38. The plate 36 acts to attenuate the signals from the local oscillator to prevent a standing wave from being created between the transducer 14 and the microphone 26.

In operation, an incoming sonic wave striking the reflector 10 in a direction parallel to its axis, is focused to the focal point of the reflector which is directly in front of the crystal of the microphone 26. Constant frequency signals from the transducer 14 are also focused at this point. A typical form for an incoming sonic wave is illustrated in FIGURE 3A while the form for the transducer output wave is illustrated in FIGURE 3B. It should be noted that the frequency of the local oscillation is preferably at least several times higher than the highest frequency of interest in the incoming sound wave and the magnitude of the local oscillation is arranged to be at least twice that of the incoming sound wave to avoid over-modulation.

The interaction between the local oscillation and the concentrated incoming sound wave at the focal point of the reflector 10 produces a complex output which includes signals of the two incoming frequencies. These signals include a wave of the local oscillator frequency as modulated by the incoming sound wave. The form of this wave is shown in FIGURE 3C. It comprises a wave of the local oscillator frequency having an envelope which is an analogue of the instantaneous magnitude of the sonic wave.

The crystal of the quartz microphone 26 is subjected to this signal complex but since it has a high sensitivity to signals of the local oscillator frequency, and relatively low sensitivity to other signals, its electrical output is predominated by a wave form of the type shown in FIGURE 3C. This wave form is provided to the receiver circuitry. The amplifier 30 may be tuned to the local oscillator frequency in order to reject the unwanted signals. Its output is provided to the detector 32 which effectively integrates the wave to provide an output having the form of the envelope of FIGURE 3C. This signal, which is an analogue of the incoming sonic signal in FIGURE 3A, is provided to the appropriate output device.

In the embodiment of the invention schematically illustrated in FIGURE 4, a parabolic reflector 50 is used to concentrate the incoming sonic energy. This energy is absorbed in a secondary reflector 52 which is disposed at the focus of the parabola 50 and which has a parabolic surface disposed complimentary to that of the main reflector. Accordingly, the second reflector experiences forces tending to move it along the main axis of the parabola when the reflected sonic energy impinges upon it. A rod 54, which extends along the central axis of the parabola, has one end connected to the secondary reflector 52 and the other end attached to a plate 56 in back of the reflector. The rod 54 is illustrated as passing through a hole in the center of the reflector 50 and is simply illustrative of appropriate mechanism for coupling the vibratory motion of the secondary reflector 52 to the plate 56.

This plate is disposed between a local oscillator 58 and an appropriate microphone 60, with its surface normal to the line between these. The microphone 60 provides its output to an appropriate receiver 62.

The operation of the embodiment of FIGURE 4 differs from that of the first embodiment in that the modulating action of the incoming sonic energy does not directly interact with the local oscillation, but rather operates through the intermediary of the plate 56. The plate is effectively deflected along the line between the local oscillator and the microphone as a function of the sonic energy reaching it. It is supported, as is the secondary reflector 52, to be responsive to the sonic energy incident upon it. Accordingly, the plate 56 will vibrate in a complex manner which will be a function of the local oscillation and the incident sonic energy. This vibration will have a component similar to that of FIGURE 3C, representing the local oscillation as modulated by the incoming sonic energy. The microphone and/or the receiver are tuned so as to be sensitive to this energy and the receiver incorporates detecting mechanism so that its output constitutes an analogue of the incoming sonic energy.

Means, not shown, may be disposed between the plate 56 and the microphone 60 to attenuate reflected waves between the two, and thus eliminate standing waves.

Figure 5:
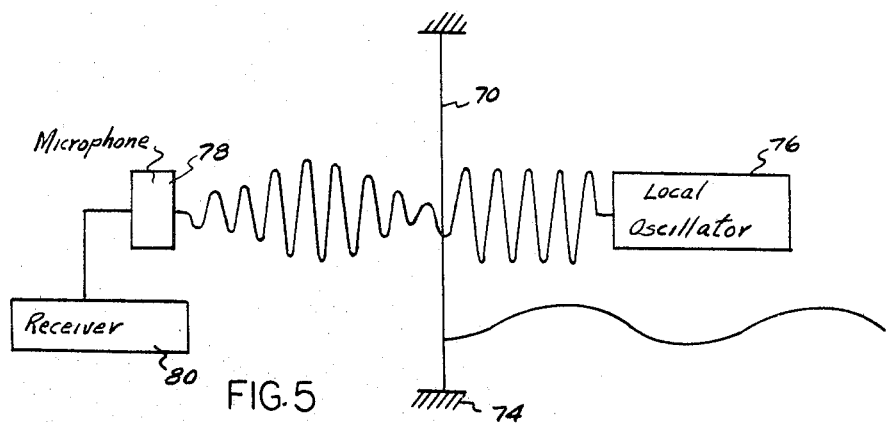
FIGURE 5 is a schematic diagram of a third embodiment of the invention wherein the incoming waves act to deflect a diaphragm which is disposed between the local oscillator and the microphone.

In the embodiment of FIGURE 5 a planar diaphragm 70 is supported between two end mounts 74 so as to vibrate in response to the pressure waves of incident sonic energy. It is disposed to receive the incoming sonic energy on one of its sides. The local sonic oscillator 76 is disposed on the same side as the incoming sonic energy so that the diaphragm 70 is exposed to pressure forces caused by both the incoming sonic energy and the local oscillation. Like the plate 56 of FIGURE 4, its motion thus includes a component resembling the wave of FIGURE 3C. A microphone 78 is disposed on the opposite side of diaphragm 70 from the oscillator 76 and provides its output to an appropriate receiver system 80. The microphone 78 may be made particularly sensitive to the local oscillator frequency, or a frequency slightly displaced therefrom, and either it or the receiver 80 may be tuned. Means, not shown, may be disposed between the diaphragm 70 and the microphone 78 to attenuate reflected waves between the two, and thus eliminate standing waves.

Figure 6:
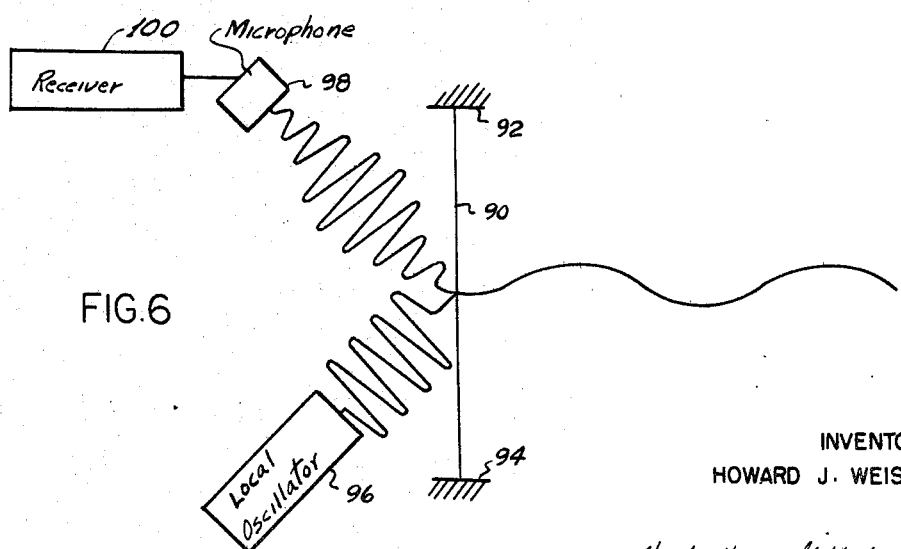
FIGURE 6 is a schematic diagram of a fourth embodiment of the invention wherein the local oscillator signal is reflected to the microphone by a diaphragm which is subjected to the incoming sonic waves.

In the embodiment of FIGURE 6 the diaphragm 90 is again supported between end restraints 92 and 94 and is subjected to sonic energy on one of its sides. In this embodiment a local oscillator 96 is disposed on the opposite side of the diaphragm 90 from that which receives the incoming energy. The oscillator is so supported with respect to the diaphragm that its beamed energy strikes the diaphragm at an angle and is reflected at an equal angle.

A directional microphone 98 is disposed on the same side of the diaphragm 90 as the oscillator 96 and at such an angle with respect to the diaphragm as to receive the energy of the local oscillator reflected from the diaphragm. Motion of the diaphragm 90 and of the force of incident incoming sonic energy acts to modulate the energy of the local oscillator reflected to the microphone 98. A receiver 100 accepts the output of the microphone to complete this system.

A sixth embodiment of the invention differs from the other embodiments in employing a tapered horn, rather than a parabolic reflector, to concentrate the incoming sonic energy. As illustrated in FIGURE 7, the horn 102 may be of conventional construction. A local oscillator 104 is supported along a central axis of the horn with its output directed at the small end thereof. The incoming sonic energy interacts with the local oscillation to produce a composite wave which is directed to a microphone 106 disposed beyond the small end of the horn. The microphone is disposed at an angle with respect to the central axis of the horn so as to reflect energy incident upon its diaphragm in a direction away from the horn. This eliminates the possibility of standing reflected waves being created between the microphone and the local oscillator.

Having thus described my invention, I claim:

1. A system for providing an electric output having a wave form analogous to that of input sonic energy, comprising: means for producing a local sonic wave; a microphone positioned with respect to said local sonic wave producing means so as to receive the sonic wave; a demodulating receiver connected to the output of the microphone; and means disposed with respect to said sonic wave producing means and said microphone for receiving incoming sonic energy and for causing the sonic energy to modulate the local sonic wave, whereby the microphone receives a signal including a component having the frequency of the local sonic wave as modulated by the incoming sonic energy.

2. The system of claim 1 wherein said local sonic wave producing means comprises an oscillator; and, a transducer connected to the oscillator so as to receive its output and being operative to produce said local sonic wave.

3. The system of claim 2 wherein the oscillator has a frequency substantially greater than the highest frequency of interest of the incoming sonic energy.

4. The system of claim 2 wherein the means for receiving the sonic energy and for causing the sonic energy to modulate the sonic output of the transducer includes means for focusing incoming sonic energy over a relatively large area into a relatively small area and thereby passing the local sonic wave through said relatively small area.

5. The system of claim 2 wherein the means for receiving the incoming sonic energy and using it to modulate the local sonic wave consists of a parabolic reflector operative to focus incoming sonic waves into a relatively small area.

6. The system of claim 5 wherein the transducer is disposed along the central axis of the parabolic reflector and the microphone is disposed along the central axis of the parabolic reflector on the opposite side of the area in which the incoming sonic wave is focused from the transducer.

7. The system of claim 2 wherein means are disposed between the transducer and the microphone to prevent the creation of standing sonic waves between the two.

8. The system of claim 2 wherein the microphone is highly sensitive to frequencies slightly displaced from the local oscillator frequency.

9. The system of claim 1 wherein the means for receiving the incoming sonic energy and using it to modulate the local sonic wave includes a plate disposed between said local sonic wave producing means and the microphone, and means for causing the plate to vibrate in response to an incoming sonic wave.

10. The system of claim 1 wherein said receiver includes a detector.

11. The system of claim 1 wherein said means for receiving the incoming sonic energy and causing it to modulate the local sonic wave consists of a diaphragm operative to receive the input sonic energy and the local sonic wave.

12. The system of claim 11 wherein said local sonic wave producing means is disposed on the opposite side of the diaphragm from the microphone.

13. The system of claim 11 wherein said local sonic wave producing means is disposed on the same side of the diaphragm as the microphone and both the microphone and said local sonic wave producing means are inclined with respect to the plane of the diaphragm so that energy reflected from the said local sonic wave producing means by the diaphragm is directed toward the microphone.

References Cited

UNITED STATES PATENTS

| | | | |
|---|---|---|---|
| 2,975,751 | 3/1961 | Bodine | 181—0.5 X |
| 3,054,592 | 9/1962 | Christoph | 181—0.5 X |
| 3,202,773 | 8/1964 | Tichy | 181—0.5 X |
| 3,300,567 | 1/1967 | Sear | 181—0.5 X |
| 3,305,043 | 2/1967 | Pfund et al. | 181—0.5 X |

BENJAMIN A. BORCHELT, Primary Examiner

T. H. WEBB, Assistant Examiner

U.S. Cl. X.R.

340—15